Patented Aug. 22, 1939

2,170,017

UNITED STATES PATENT OFFICE 2,170,017

PROCESS OF CONVERTING SOLUBLE INTO INSOLUBLE CELLULOSE DERIVATIVES

Walter Frey, Freiburg, Breisgau, and Heinz Schwalenstöcker, Korbach, near Cassel, Germany, assignors to the firm E. I. du Pont de Nemours & Co., Wilmington, Del.

No Drawing. Application July 30, 1937, Serial No. 156,576. In Germany July 31, 1936

9 Claims. (Cl. 260—225)

This invention relates to a process of converting soluble cellulose derivatives into insoluble cellulose derivatives. In the art of cellulose derivatives there is known a great variety of processes for making cellulose esters and cellulose ethers. All the products, as known, are soluble in certain solvents or mixtures of solvents and partly also in water without undergoing any chemical change. Thus, for instance cellulose triacetate (also called primary acetate) is soluble in chloroform but not in acetone, while cellulose diacetate (also called secondary acetate) is soluble in acetone but not in chloroform; on the other hand, benzyl cellulose is soluble in benzol, while nitrocellulose again is soluble in the known mixture of alcohol and ether, and methylcellulose methylated to a sufficient degree is soluble in cold water.

This feature of solubility inherent in cellulose derivatives has in many cases proved to be of disadvantage in connection with the finished products made from said derivatives, such as films, artificial silks, varnishes and the like. Attention may for instance be directed to the cellulose acetate artificial silk which requires a careful selection of the necessary solvent for the chemical purification or for certain other treatment processes.

Now, we have found that the solubility which, although to a greater or smaller extent, is inherent in all cellulose derivatives may be successfully avoided by a simple treatment; in addition to this, we have made the valuable observation that the cellulose derivatives, when treated by the process forming part of our present invention are characterized by an essentially greater thermal constancy as compared with the initial products. This circumstance is of significant importance inasmuch as, for instance, in case of cellulose acetate artificial silk there is attained a greatly improved ironing strength, and in case of other plastical bodies made from cellulose derivatives there will be greater hardness at higher temperatures and so forth. In other respects, however, the favorable properties of cellulose esters or ethers such as for instance their ability of permitting coloring, as well as their softness, flexibility, tensile strength and tearing strength will be fully retained in the final products when employing our new process.

In order to carry out our new process the respective cellulose derivatives or the structures made therefrom are subjected to a treatment with acid halogenides of dibasic or polybasic acids such as for instance, oxalyl chloride (COCl—COCl), in which case, for instance, solutions of the aforementioned acid halogenides in inert solvents may be caused to act on the cellulose derivatives. The acid halogenides of the dibasic and polybasic acids may also be caused to act in vaporous state onto the cellulose derivatives. These processes, moreover, may be carried out at a lower as well as at a higher temperature. Furthermore, catalytically active substances, such as pyridine may also be added. In case the treatment is conducted at a low temperature or during a short time of reaction the obtained products will still be able to swell, while at higher temperatures or during longer times of reaction the products become fully insoluble. In this way it will be possible to produce at will either products which will swell or insoluble products by properly selecting the conditions of the reactions. At temperatures below 0° the reaction may be very easily adjusted with respect to the desired character of the final products.

The cellulose derivatives to be subjected to the new process may be in the form of films, threads, pressed masses, varnish coatings and so forth or in the form of solutions. In the latter case the cellulose derivatives will be rendered insoluble by treatment with the acid-halogenides of dibasic or polybasic acids and are obtained as precipitate from the solution.

The cellulose derivatives to be treated by our new process comprise all organic and inorganic esters and ethers of cellulose, such as cellulose formate, acetate, propionate, benzoate, nitrate and so forth, methyl, ethyl or benzyl cellulose and so forth and mixed esters and mixed ethers.

Our present process may be illustrated by the following examples:

Example 1

Fully dry cellulose acetate artificial silk in the form of a textile or of a rope is immersed into a solution comprising oxalyl-chloride, 10% by weight as compared with the silk, dissolved in dry carbon tetrachloride, the ratio of floating being 1:10. The bath may either be caused to re-act at normal temperature, the time of treatment amounting to from one half to two hours or the reaction may be accelerated by boiling and by taking advantage of reflux treatment.

The cellulose acetate artificial silk will now be insoluble in acetone, chloroform and all other solvents and will present especially favorable properties as regards ironing strength, at the same time retaining its ability of being colored with acetate dyestuffs as well as its other properties relating to texture.

Example 2

A film consisting of cellulose acetate is treated in a vacuum with malonyl-chloride vapor by heating to 40° with the result that said film will become insoluble in all solvents. Moreover, the swelling property of the film so treated in acetone and other cellulose acetate solvents which may be present after a short time of treatment will be decreasing with increasing times of treatment.

Example 3

Benzyl-cellulose is dissolved in benzol. 20% of succinyl-chloride is added to the solution, and the mass so obtained heated and treated by reflux. The reaction product will separate in the form of an insoluble swollen-up mass. By carefully adding pyridine the reaction may be accelerated. The product so obtained may be used subsequent to the addition of softening agents as pressed mass.

Example 4

An acetate artificial silk in the form of a textile or rope is immersed in an amount of toluol corresponding to from ten to twenty times that of the silk and the liquid is subjected to distillation until the toluol distils in condition free of water. Thereupon 20% of thionyl-chloride by weight, as compared with the silk, is added and the reaction caused to proceed in cold or heated condition of the mass. In this way there is obtained an insoluble acetate artificial silk, which regarding its textile properties is in agreement with the silk obtained by the process indicated in Example 1.

Example 5

Artificial silk made from cellulose acetate is treated with 20% of tricarballylic acid-chloride by weight, as compared with the silk, under the conditions stated in Example 4. In this way there is obtained an insoluble artificial silk consisting of cellulose acetate having the same properties as the silk treated according to Examples 1 and 4.

We claim:

1. Process of converting soluble organic cellulose derivatives into insoluble organic cellulose derivatives in the form of films, threads, textiles, pressed masses and the like, which process comprises reacting said soluble cellulose derivatives with acid halogenides of an organic acid which is at least dibasic, and continuing said reaction until said soluble cellulose derivatives are rendered substantially insoluble.

2. Process as specified by claim 1, in which process the cellulose derivative consists of a cellulose ester.

3. Process as specified by claim 1, in which process the cellulose derivative consists of a cellulose ether.

4. Process as specified by claim 1, in which process the cellulose derivative consists of cellulose acetate artificial silk.

5. Process of converting soluble into insoluble cellulose acetate artificial silk, which process consists in reacting said silk in dry condition in a solution comprising oxalyl chloride dissolved in tetrachloric hydrocarbon and continuing said reaction until said cellulose acetate silk is rendered substantially insoluble.

6. Process of converting a film consisting of soluble cellulose acetate into an insoluble film, which process consists in treating the film in a vacuum with malonyl-chloride vapor in heated condition.

7. Process of converting a soluble into an insoluble and swollen-up mass to be used as pressed mass, which process consists in dissolving benzyl-cellulose in benzol, adding succinol-chloride to the solution and heating the mass so obtained, whereby the insoluble and swollen-up mass will be separated as the reaction proceeds.

8. A process as specified by claim 7, in which process pyridin is added to accelerate the reaction.

9. Process as specified by claim 1, which process consists in regulating the conditions of reaction to retain a greater or smaller swelling ability of the cellulose derivatives.

WALTER FREY.
HEINZ SCHWALENSTÖCKER.